United States Patent
Ledgerwood et al.

(10) Patent No.: US 10,454,415 B2
(45) Date of Patent: Oct. 22, 2019

(54) ELECTRICAL BOX INCLUDING JUMPER FOR REDUCING CONDUCTIVE HEAT TRANSFER BETWEEN ELECTRICAL COMPONENTS

(71) Applicant: Eaton Intelligent Power Limited, Dublin (IE)

(72) Inventors: Adam Douglas Ledgerwood, Syracuse, NY (US); Matthew Thomas Pernot, Kirkville, NY (US); Arkadiusz Oskar Doroz, Liverpool, NY (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 15/915,917

(22) Filed: Mar. 8, 2018

(65) Prior Publication Data
US 2018/0262158 A1    Sep. 13, 2018

Related U.S. Application Data

(60) Provisional application No. 62/468,740, filed on Mar. 8, 2017.

(51) Int. Cl.
*H02S 40/34*      (2014.01)
*H01R 25/16*      (2006.01)
*H02B 1/18*       (2006.01)
*H02G 3/03*       (2006.01)
*H02B 1/20*       (2006.01)
(Continued)

(52) U.S. Cl.
CPC ....... *H02S 40/345* (2014.12); *H01H 85/2045* (2013.01); *H01R 25/162* (2013.01); *H02B 1/18* (2013.01); *H02B 1/20* (2013.01); *H02B 1/48* (2013.01); *H02B 1/56* (2013.01); *H02G 3/03* (2013.01); *H02G 3/10* (2013.01); *H02G 3/081* (2013.01)

(58) Field of Classification Search
USPC .......................................... 361/624; 136/244
See application file for complete search history.

(56) References Cited

U.S. PATENT DOCUMENTS 5,421,751 A    6/1995   Bennett et al.
5,478,244 A    12/1995  Maue et al.
(Continued)

FOREIGN PATENT DOCUMENTS

RU        2593461 C1     8/2016

OTHER PUBLICATIONS

International Search Report and Written Opinion for PCT/US18/21555, dated May 15, 2018, 12 pages.

*Primary Examiner* — Mukundbhai G Patel
(74) *Attorney, Agent, or Firm* — Stinson LLP

(57) ABSTRACT

An electrical box includes a first electrical component having an output terminal, and a second electrical component having an input terminal. A jumper is connected to the output terminal of the first electrical component and the input terminal of the second electrical component. The jumper defines a heat flow path between the first and second electrical components. The heat flow path defines a minimum path between the first and second electrical components along the heat flow path. A minimum distance along the minimum heat path between the first and second electrical components is greater than a minimum distance between first and second electrical components.

18 Claims, 15 Drawing Sheets

(51) Int. Cl.
*H02B 1/56* (2006.01)
*H01H 85/20* (2006.01)
*H02B 1/48* (2006.01)
*H02G 3/10* (2006.01)
*H02G 3/08* (2006.01)

(56) References Cited

U.S. PATENT DOCUMENTS

| | | | |
|---|---|---|---|
| 7,170,163 B2 * | 1/2007 | Murakami | H01L 23/367 257/707 |
| 2012/0113569 A1 | 5/2012 | Peralta et al. | |
| 2015/0103454 A1 * | 4/2015 | Schripsema | H02H 3/087 361/63 |

* cited by examiner

US 10,454,415 B2

ELECTRICAL BOX INCLUDING JUMPER FOR REDUCING CONDUCTIVE HEAT TRANSFER BETWEEN ELECTRICAL COMPONENTS

CROSS-REFERENCE TO RELATED APPLICATIONS

The present application claims the benefit of U.S. Provisional Application No. 62/468,740, filed Mar. 8, 2017, the entirety of which is hereby incorporated by reference.

FIELD OF THE DISCLOSURE

The present disclosure generally relates to an electrical box, such as solar combiner box, including a jumper for reducing conductive heat transfer between electrical components within the electrical box.

BACKGROUND OF THE DISCLOSURE

In one example, a solar power system (e.g., photovoltaic module systems) typically includes a solar combiner box installed generally between the solar panels (e.g., photovoltaic modules) and the inverter of the system. String conductors (i.e., input wires) from a plurality of solar panels are electrically connected to input terminals of fuse holders within the solar combiner box. Output terminals of the fuse holders are electrically connected to a single combiner box conductor, such as a conductor including a busbar electrically and physically connected to the output terminals of the fuse holders. The busbar electrically connects the output terminals of the fuse holders to a main output terminal (e.g., one or more output lugs) of the solar combiner box. A main output line electrically connected to the output terminal of the combiner box connects to the solar inverter. Accordingly, the solar combiner box consolidates incoming power from the solar panels (e.g., photovoltaic modules) into a main output line to distribute the power to a solar inverter.

Recently, solar combiner boxes may include a device for arc-fault protection. For example, a solar combiner box may include a contactor, which may be controlled remotely, for breaking electrical connection between the fuse holders and the main output terminal.

Other solar combiner boxes may also be considered smart solar combiner boxes. These smart solar combiner boxes also include electrically operated devices.

SUMMARY OF THE DISCLOSURE

In one aspect, a solar combiner box generally comprises an enclosure defining an interior. A plurality of fuse holders are in the interior of the enclosure. Each plurality of fuse holders includes an output terminal. A main output terminal is in the interior of the enclosure. A busbar assembly connects the plurality of fuse holders to the main output terminal. The busbar assembly includes a fuse holder busbar connected to the output terminals of the plurality of busbars, a main output jumper connected to the main output terminal, and a switch selectively connecting the fuse holder busbar and the main output jumper. The fuse holder busbar defines a heat flow path from the electrically controlled switch to the plurality of fuse holders. The heat flow path defines a minimum path from the electrically controlled switch to a nearest output terminal of anyone of the fuse holders along the heat flow path. A minimum distance along the minimum path from the electrically controlled switch to the nearest output terminal of the corresponding fuse holder is greater than a minimum distance between the electrically controlled switch and an output terminal of one of the fuse holders.

In another aspect, a solar combiner box generally comprises an enclosure defining an interior. A plurality of fuse holders are in the interior of the enclosure. Each of the fuse holders includes an output terminal. A main output terminal is in the interior of the enclosure. A busbar assembly connects the plurality of fuse holders to the main output terminal. The busbar assembly includes a fuse holder busbar connected to the output terminals of the plurality of busbars, a main output jumper connected to the main output terminal, and an electrically controlled switch selectively connecting the fuse holder busbar and the main output jumper. The main output jumper defines a heat flow path from the electrically controlled switch to the main output terminal. The heat flow path defines a minimum path from the electrically controlled switch to the main output terminal along the heat flow path. A minimum distance along the minimum path from the electrically controlled switch to the main output terminal is greater than a minimum distance between the electrically controlled switch and the main output terminal.

In yet another aspect, an electrical box generally comprises an enclosure defining an interior. A first electrical component includes an output terminal. A second electrical component includes an input terminal. A jumper is connected to the output terminal of the first electrical component and the input terminal of the second electrical component. The jumper defines a heat flow path between the first and second electrical components. The heat flow path defines a minimum path between the first and second electrical components along the heat flow path. A minimum distance along the minimum heat path between the first and second electrical components is greater than a minimum distance between first and second electrical components.

BRIEF DESCRIPTION OF THE DRAWINGS

Corresponding reference characters indicate corresponding parts throughout the drawings.

DETAILED DESCRIPTION OF THE DISCLOSURE

Figure 1:
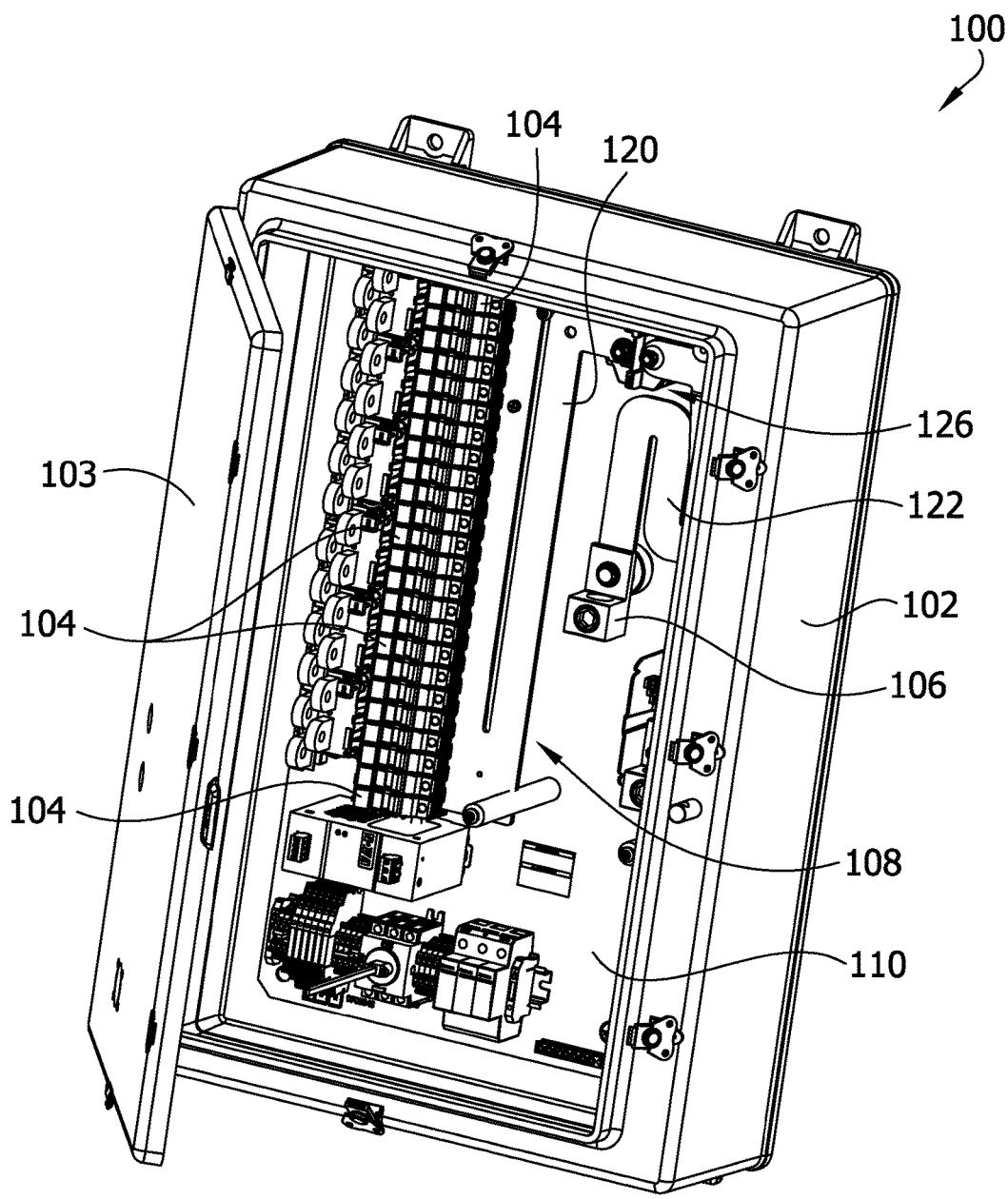
FIG. 1 is a perspective of a solar combiner box constructed according to the teachings of the present disclosure.

Referring to FIG. 1, a solar combiner box constructed according to the teachings of the present disclosure is generally indicated at reference numeral 100. The solar combiner box includes an enclosure 102, which may include a door 103 as illustrated, defining an interior. The solar combiner box 100 further includes a plurality of fuse holders 104 (e.g., a row of fuse holders) for electrically connecting to and receiving power from string conductors (e.g., cables or wires; not shown) from an array of solar panels (e.g., photovoltaic modules; not shown); a main output terminal 106, which may include one or more output lugs, for connection to a main output line (not shown); and a busbar assembly, generally indicated at 108, electrically connecting the fuse holders to the main output terminal. These components are mounted on a panel 110 within the enclosure 102. The illustrated fuse holders 104, the string conductors (not shown), the main output terminal 106, and the main output line (not shown) are generally known in the art, although these components may be of other designs or constructions. The illustrated solar combiner box 100 also includes additional components, such as but not limited to a power supply, arc fault detectors, power distribution block, surge protector, manual control switch, relays, and ground terminals, each of which is generally known in the art. In other embodiments, the solar combiner box 100 may not include one or more of these additional components, and/or the solar combiner box may include other additional components. It is also understood that the teachings set forth in the present disclosure may apply to other types of electrical boxes, other than solar combiner boxes.

Figure 3:
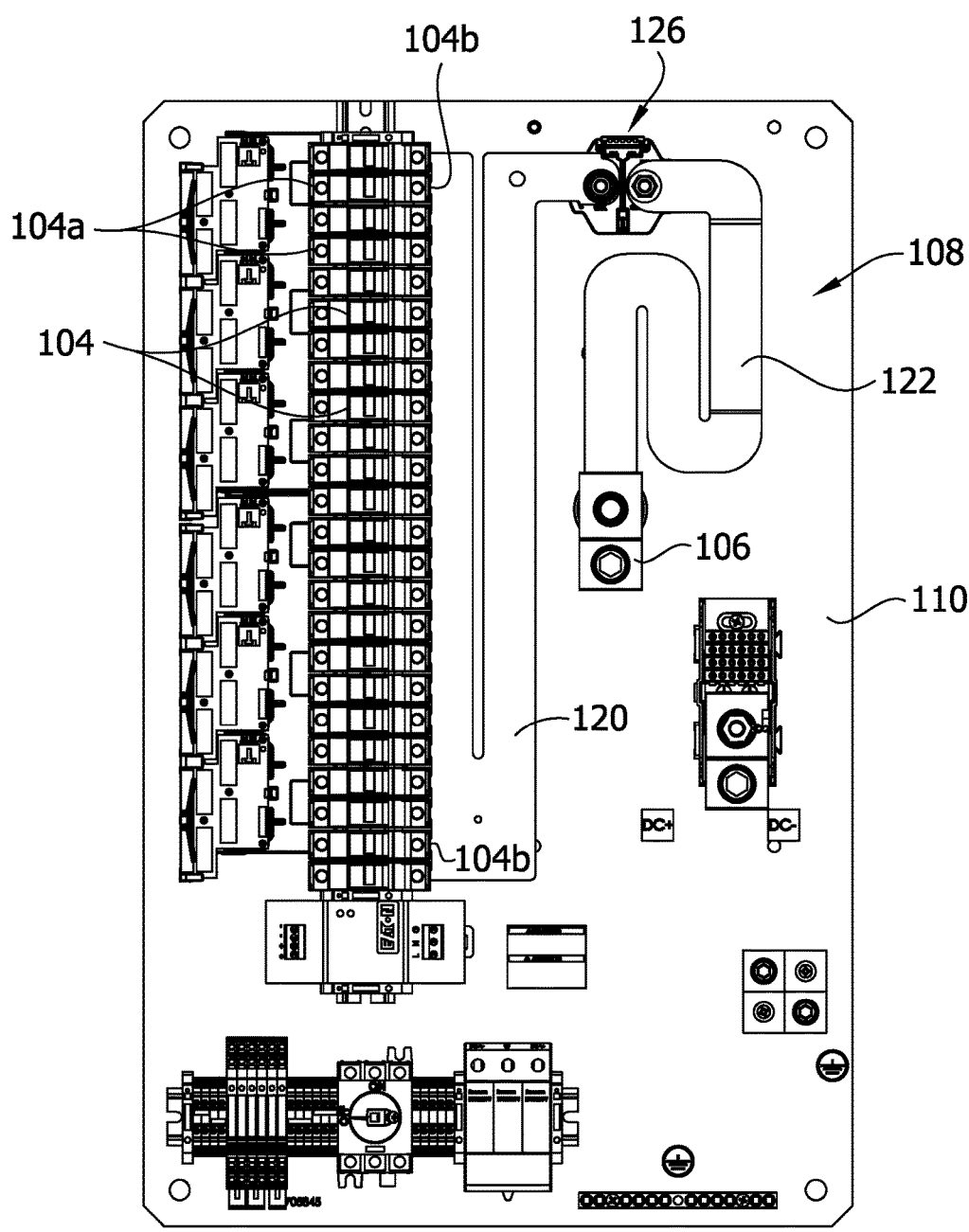
FIG. 3 is a plan view of FIG. 2.

In the illustrated embodiment, the fuse holders 104 are arranged in a row extending vertically in the enclosure 102. As shown in FIG. 3, input terminals 104a of the fuse holders 104, to which the string conductors are connected, are positioned to be on a left side of the fuse holders. Thus, the string conductors are to be positioned on the left side of the fuse holders 104, as can be envisioned from FIG. 3, for example. Output terminals 104b of the fuse holders 104, to which the busbar assembly 108 is connected, are positioned on a right side of the fuse holders. Thus, at least a portion of the busbar assembly 108 (e.g., the entirety of the busbar assembly in the illustrated embodiment) is positioned on a side (e.g., the right side) of the fuse holders 104. The arrangements and/or relative locations of the fuse holders 104, the string conductors, the busbar assembly 108 and/or other components may be arranged in other ways and/or have other relative locations without necessarily departing from the scope of the present invention.

Figure 5:
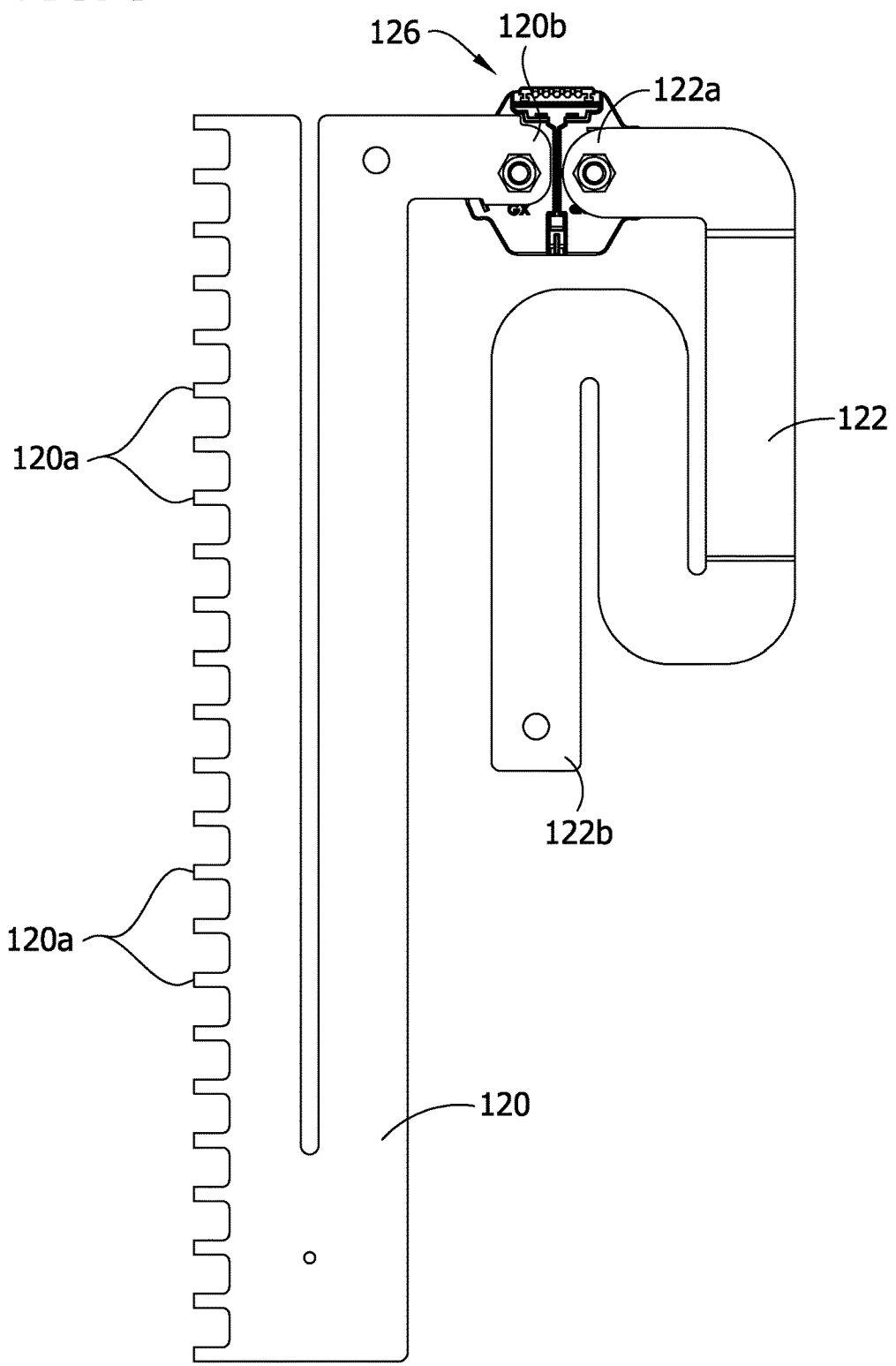
FIG. 5 is a plan view of busbar assembly of the solar combiner box.

As shown in FIG. 5, in one or more embodiments, the busbar assembly 108 includes a fuse holder busbar 120 (broadly, a jumper), a main output jumper 122 (broadly, a jumper), and a switch 126 (e.g., an electrically controlled switch; broadly, an electrical component) selectively connecting the busbar 120 and the jumper 122. The fuse holder busbar 120 may include one or more busbars (e.g., one busbar as illustrated) connecting the output terminals of the fuse holders 104 to the electrically controlled switch 126. The main output jumper 122 may include one or more jumpers (e.g., one jumper as illustrated) connecting the electrically controlled switch 126 to the main output terminal 106. In one or more examples, one or both of the fuse holder busbar 120 and the main output jumper 122 comprises a strip or bar including electrically conductive material, such as but not limited to a copper, brass, aluminum, or electrically conductive material. The busbar 120 and/or the jumper 122 may be of other configurations.

Figure 2:
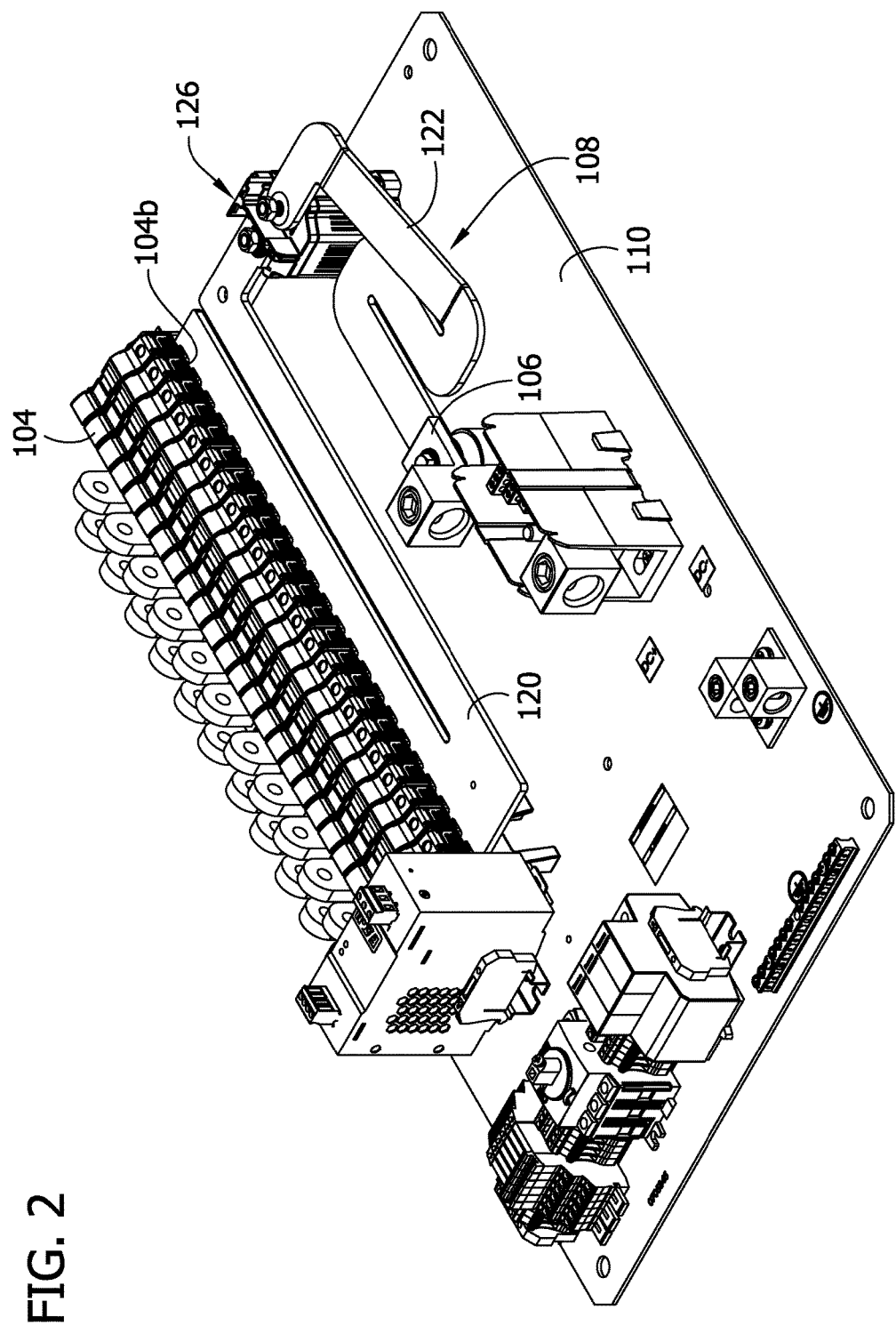
FIG. 2 is a perspective of components of the solar combiner box mounted on a panel removed from an interior of the solar combiner box.
Figure 4:
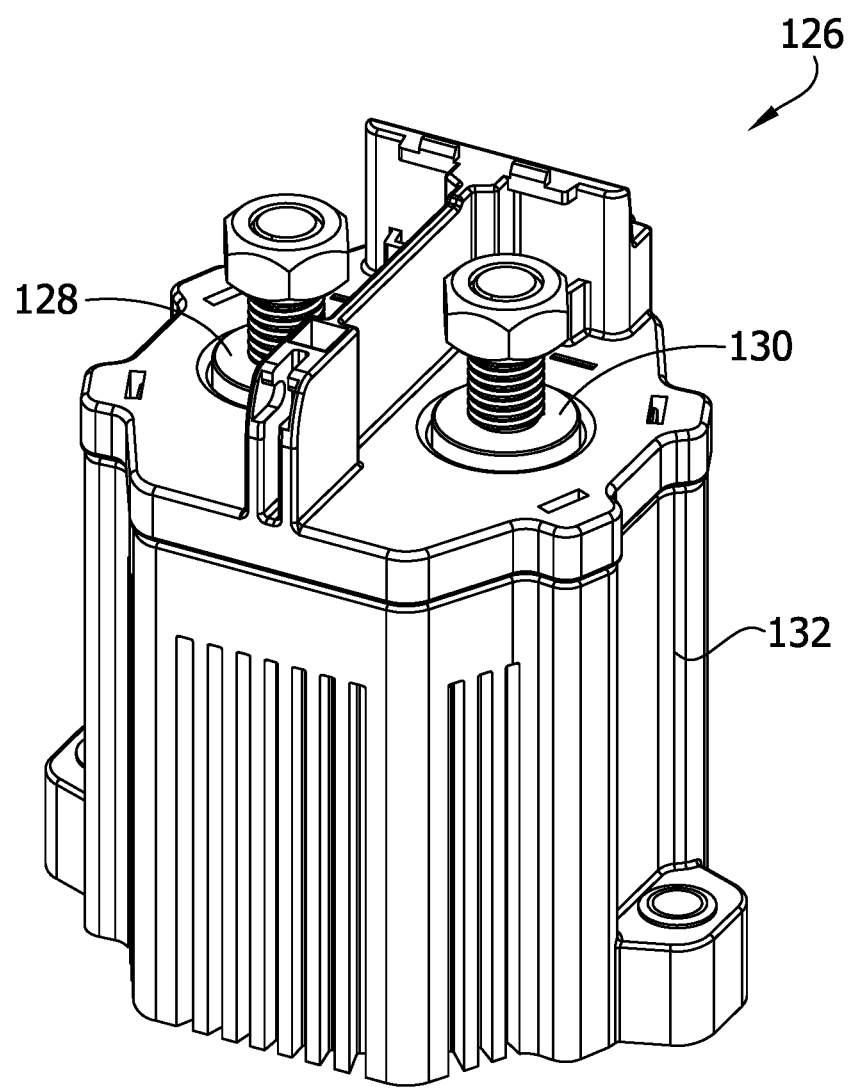
FIG. 4 is an enlarged perspective of a contactor of the solar combiner box.

Referring to FIGS. 2-4, the illustrated electrically controlled switch 126 comprises a contactor (indicated by the same reference numeral 126) configured to selectively break electrical connection between the fuse holder busbar 120 and the main output jumper 122. The contactor 126 may be operated remotely (i.e., the circuit of the busbar assembly 108 may be opened remotely via the contactor). As shown in FIG. 4, the illustrated contactor 126 includes input and output contacts, 128, 130, respectively, and an electromagnet (not shown) within a housing 132 of the contactor and energized by power from a separate power source (not shown), for example. In normal, no-fault operation, the output terminal of the fuse holder busbar 120 is electrically connected to the input contact 128 of the contactor 126, and the input terminal of the main output jumper 122 is electrically connected to the output contact 130 of the contactor. In this normal operation, power is supplied to the electromagnet of the contactor 126, whereby the electromagnet brings at least one of the busbar 120 and the jumper 122 into contact with the corresponding contact 128, 130 to close the circuit of the busbar assembly 108. Thus, in normal operation heat is being generated by the contactor 126. At least one of the input and output contacts is selectively openable and closable to open and close the circuit of the busbar assembly 108. To open the circuit of the busbar assembly 108, current supplied to the electromagnet is cutoff, whereby at least one of busbar 120 and the jumper 122 is free from contact with (e.g., spaced apart from) the corresponding input and output contacts 128, 130. The busbar assembly 108 may include other types of electrically controlled switches for selectively breaking electrical connection between the fuse holder busbar 120 and the main output jumper 122. Moreover, the busbar assembly 108 may include other types of electrically controlled devices in addition to or in place of the electrically controlled switch.

Figure 6:
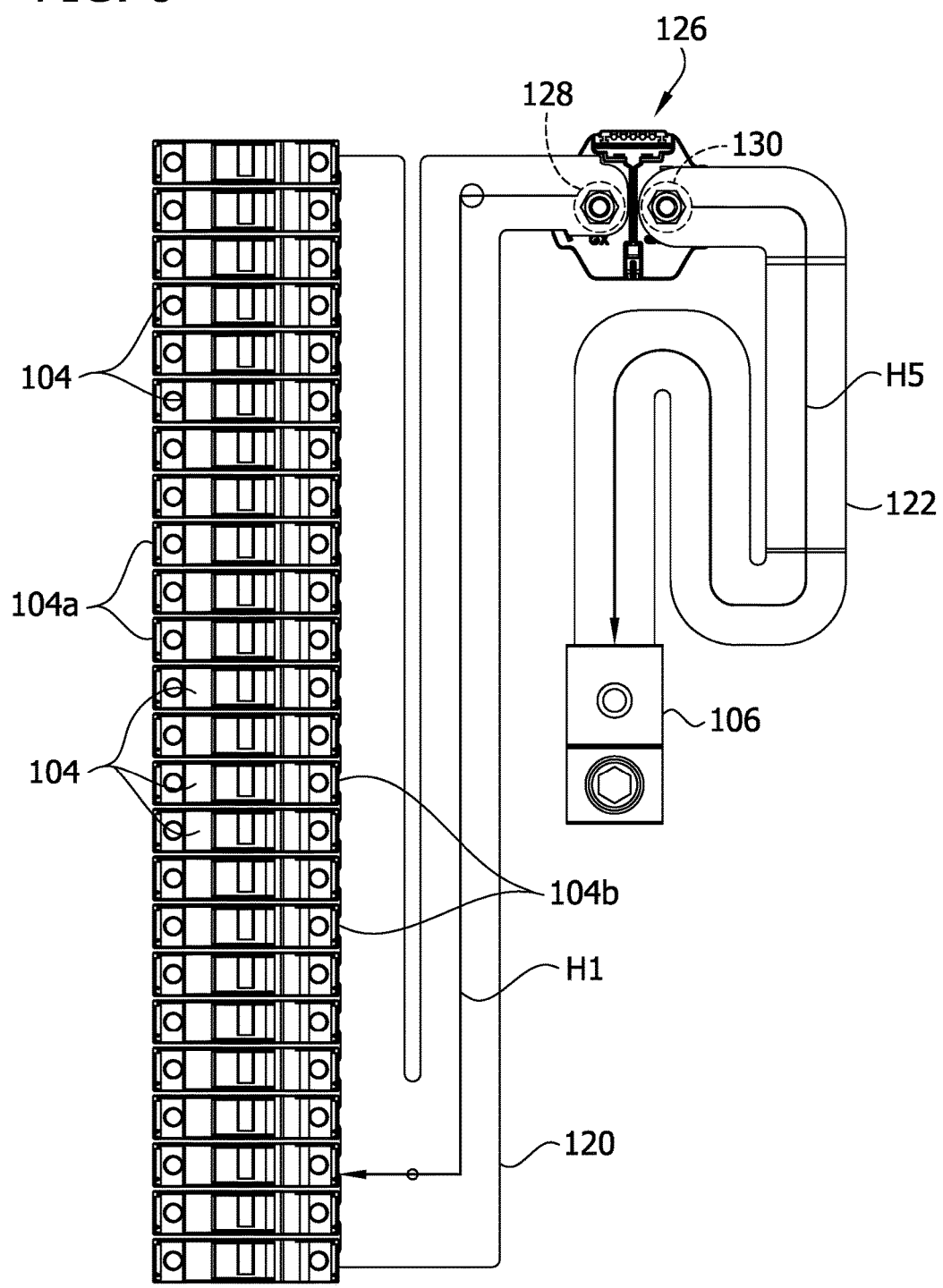
FIG. 6 is similar to FIG. 5, including a plurality of fuse holder and a main outlet terminal connected to the busbar assembly.

The illustrated fuse holder busbar 120 of the busbar assembly 108 defines a heat flow path flowing from the contactor 126 to the fuse holders 104. As shown in FIG. 6, the heat flow path defines a minimum path having a centerline H1 that bisects the heat flow path from the input contact 128 to the nearest output terminal 104b of anyone of the fuse holders 104 along the heat flow path. The illustrated heat flow path, the minimum path, and the corresponding shortest centerline H1 include a plurality of turns (i.e., changes in direction) as the heat flows toward the fuse holder busbar 120. As can be seen from FIG. 2, for example, in the illustrated fuse holder busbar 120, these turns are made in the plane of the busbar 120, and thus, these turns are in a two-dimensional plane. It is understood that the turns may be three-dimensional in other embodiments. At least a portion of the heat flow path of the illustrated fuse holder busbar 120 flows downward against the buoyancy force of heat, and upward against the force of gravity. In the illustrated embodiment, the contactor 126 is aligned horizontally with (broadly, generally adjacent to) an upper portion (broadly, a first end) of the vertical row of fuse holders 104, and the nearest output terminal 104*b* in the minimum path is at the lower portion (broadly, a second end) of the vertical row of fuse holders. Moreover, the upper portion (or firs end) of the row of fuse holders is downstream of the lower portion (or second end) of the row of fuse holders along the heat flow path.

The minimum path defined by the fuse holder busbar 120 has an increased length by virtue of the busbar defining the plurality of turns of the heat flow path. As can be understood from FIGS. 6 and 7, a minimum distance along the minimum heat flow path from the input contact 128 to the nearest output terminal 104*b* of anyone of the fuse holders 104 is greater than a minimum distance d1 (i.e., the shortest distance) between the contactor and an output terminal of one of the fuse holders. In one or more examples, the minimum distance along the minimum path may be from about 10% to about 2000% greater than, or from about 25% to about 1500% greater than, or from about 50% to about 1000%, or from about 100% to about 3000% or from about 100% to about 2000% greater than the minimum distance d1 between the input contact 128 of the contactor 126 and the output terminal of the nearest fuse holder 104. In one or more examples, the minimum distance along the minimum path may be from about 25% to about 100%, or from about 33% to about 75%, or from about 50% to about 75% of the length of the vertical row of fuse holders 104.

The length of the centerline H1 is greater than the minimum distance d1 (i.e., the shortest distance) between the input contact 128 of the contactor 126 and the output terminal of the nearest fuse holder 104. In one or more examples, the length of the centerline H1 of the minimum path may be from about 33% to about 2000% greater than, or from about 50% to about 1500% greater than, or from about 100% to about 1000%, or from about 100% to about 3000% or from about 100% to about 2000% greater than the minimum distance d1 between the input contact 128 of the contactor 126 and the output terminal of the nearest fuse holder 104.

By having the minimum path greater than the minimum distance d1, the amount of heat (J) from the contactor 126 that reaches the fuse holders 104 through conduction via the fuse holder busbar 120—and thus the average temperature of the fuse holder busbar at the fuse holders (e.g., at the input terminals 120*a* of the fuse holder busbar)—is reduced. Thus, a fuse holder busbar 120 designed according to the teachings set forth herein can reduce the temperatures at the fuse holders 104 to at or below the ratings of the fuse holders and likewise reduce the temperatures at the fuses in the fuse holders to at or below the ratings of the fuses. Moreover, because a portion the heat flow path of the illustrated fuse holder busbar 120 flows upward and against the force of gravity (e.g., the portion extending upward and extending along the fuse holders 104) and downward against the buoyancy of heat when the box is oriented vertically such as shown in FIG. 1, for example, conductive heat transfer from the contactor 126 to the fuse holders 104 is further reduced. In addition to reducing the temperatures of the fuse holders 104, the fuse holder busbar 120 designed according to the teachings set forth herein can also reduce the magnitude of the ambient temperature gradient in the enclosure 102 by dissipating heat via convection along the increased heat flow path of the fuse holder busbar.

Figure 8:
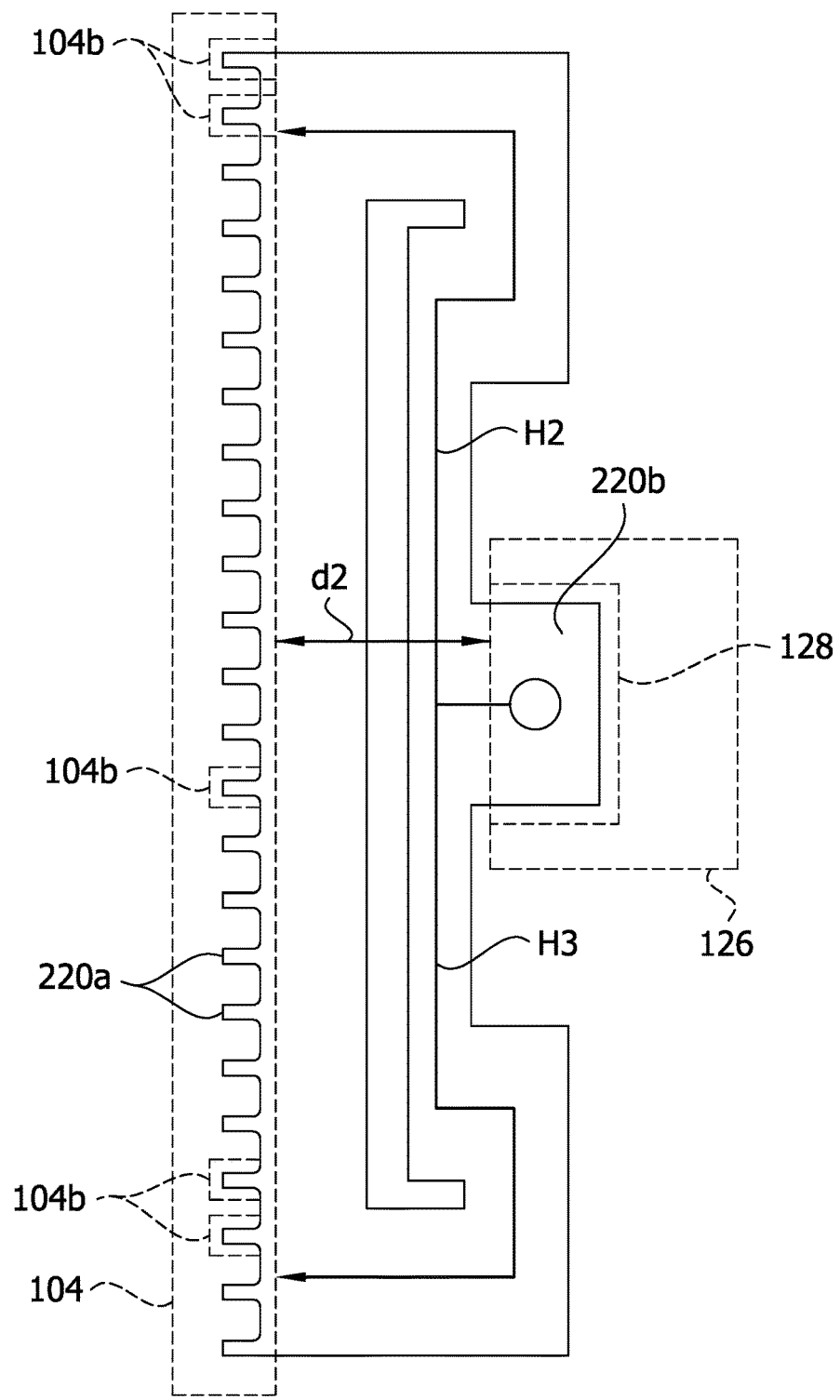
FIG. 8 is a plan view of a second embodiment of a fuse holder busbar for a busbar assembly.

Referring to FIG. 8, another example of a fuse holder busbar designed and constructed according to the teachings set forth herein is generally indicated at reference numeral 220. This busbar 220 has a plurality of input terminals 220*a*, similar to the first busbar 120 and configured to connect to the fuse holders 104. An output terminal 220*b*, configured to connect to the contactor 126 in the manner set forth above with respect to the first fuse holder busbar 126, is disposed between upper and lower ends of the busbar 220 (e.g., adjacent a mid-length point) on a side of the busbar opposite the input terminals 220*a*. The fuse holder busbar 220 defines more than one heat flow path flowing from the contactor 126 to the fuse holders 104. For example, in the illustrated embodiment, the busbar divides (e.g., bifurcates) the heat flow path into a first heat flow path directed in a first direction (e.g., upward) relative to the output terminal 220*b* and toward the input terminals 220*a*, and a second heat flow path directed in a second direction opposite the first direction (e.g., downward) relative to the output terminal and toward the input terminals.

Each of the first and second heat flow paths defines a minimum path having a respective centerline H2, H3 that bisects the corresponding heat flow path from the input contact 128 to the nearest output terminal of anyone of the fuse holders 104 along the heat flow path. The illustrated heat flow paths, the minimum paths, and the corresponding centerlines H1 include a plurality of turns (i.e., changes in direction) as the heat flows toward the fuse holder busbar 120. In the illustrated fuse holder busbar 120, these turns are made in the plane of the busbar 120, and thus, these turns are in a two-dimensional plane. It is understood that the turns may be three-dimensional in other embodiments.

The minimum paths defined by the fuse holder busbar 120 have an increased combined length (i.e., a sum of the lengths of the centerlines) by virtue of the busbar dividing the heat flow path into more than one path and each of the paths defining the plurality of turns. As can be understood from FIG. 8, a minimum distance along any one of the minimum paths from the input contact 128 to the nearest respective output terminals 104*b* of anyone of the fuse holders 104 is greater than the minimum distance d2 (i.e., the shortest distance) between the input contact 128 of the contactor 126 and the output terminal of the nearest fuse holder 104. In one or more examples, the combined minimum distance along the combined minimum path may be from about 10% to about 2000% greater than, or from about 25% to about 1500% greater than, or from about 50% to about 1000%, or from about 100% to about 3000% or from about 100% to about 2000% greater than the minimum distance d2 between the input contact 128 of the contactor 126 and the output terminal of the nearest fuse holder 104. In one or more examples, the combined minimum distance along the combined minimum path may be from about 25% to about 100%, or from about 33% to about 75%, or from about 50% to about 75% of the length of the vertical row of fuse holders 104.

As can be understood from FIG. 8, the length of at least one of the centerlines H2, H3 is greater than the minimum distance d2 (i.e., the shortest distance) between the input contact 128 of the contactor 126 and the output terminal of the nearest fuse holder 104. In one or more examples, the combined length of the centerlines H2, H3 of the minimum paths may be from about 33% to about 2000% greater than, or from about 50% to about 1500% greater than, or from about 100% to about 1000%, or from about 100% to about 3000% or from about 100% to about 2000% greater than the minimum distance d2 between the input contact 128 of the contactor 126 and the output terminal of the nearest fuse holder 104.

By having the combined minimum paths greater than the minimum distance d2, the amount of heat (J) from the contactor 126 that reaches the fuse holders 104 through conduction via the fuse holder busbar 220—and thus the average temperature of the fuse holder busbar at the fuse holders (e.g., at the input terminals 220*a* of the fuse holder busbar)—is reduced. Thus, the fuse holder busbar 220 designed according to the teachings set forth herein can reduce the temperatures at the fuse holders 104 to at or below the ratings of the fuse holders and likewise reduce the temperatures at the fuses in the fuse holders to at or below the ratings of the fuses. Moreover, because a portion of the minimum path of the second heat flow path of the illustrated fuse holder busbar 220 flows upward and against the force of gravity and downward against the buoyancy of heat when the box is oriented vertically such as shown in FIG. 1, for example, heat conductive heat transfer from the contactor to the fuse holders 104 is further reduced. In addition to reducing the temperatures of the fuse holders 104, the fuse holder busbar 220 designed according to the teachings set forth herein can also reduce the ambient temperature gradients in the enclosure 102 by dissipating heat via convection along the increased heat flow path of the fuse holder busbar.

Figure 9:
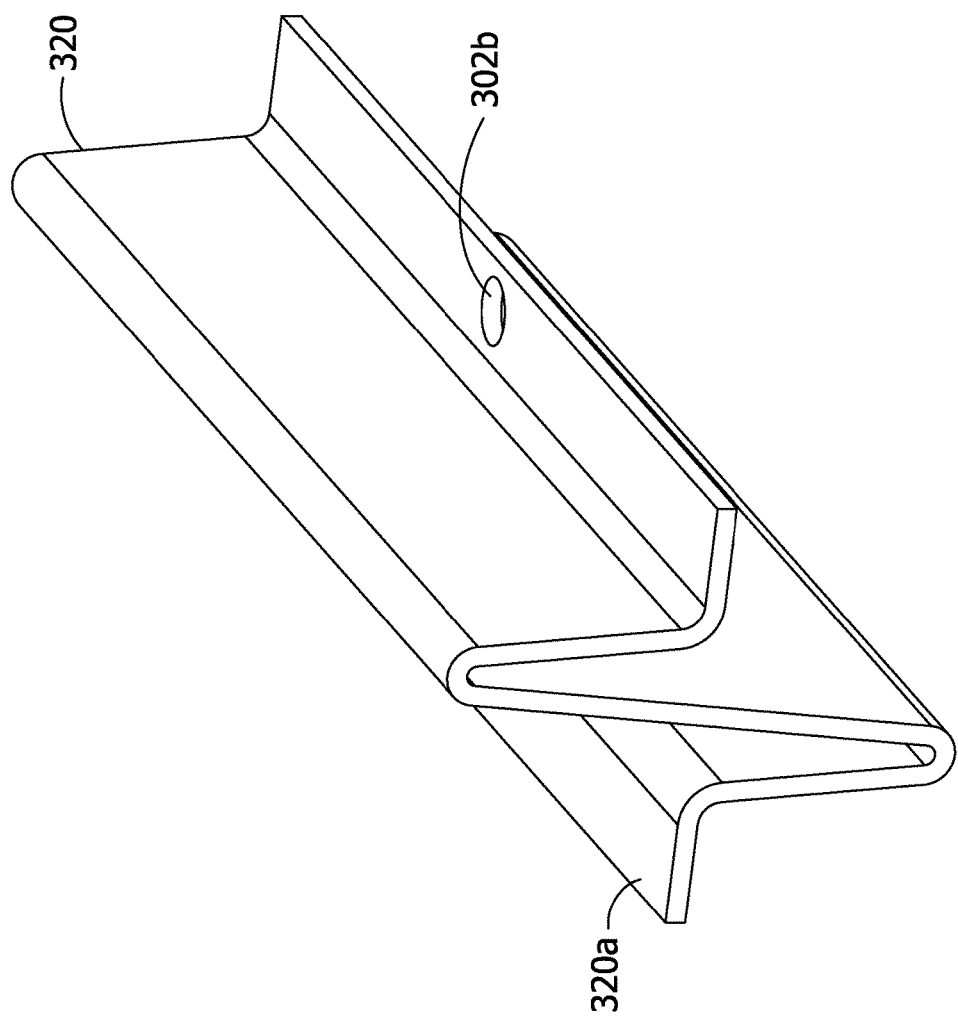
FIG. 9 is a perspective of a third embodiment of a fuse holder busbar for a busbar assembly.
Figure 10:
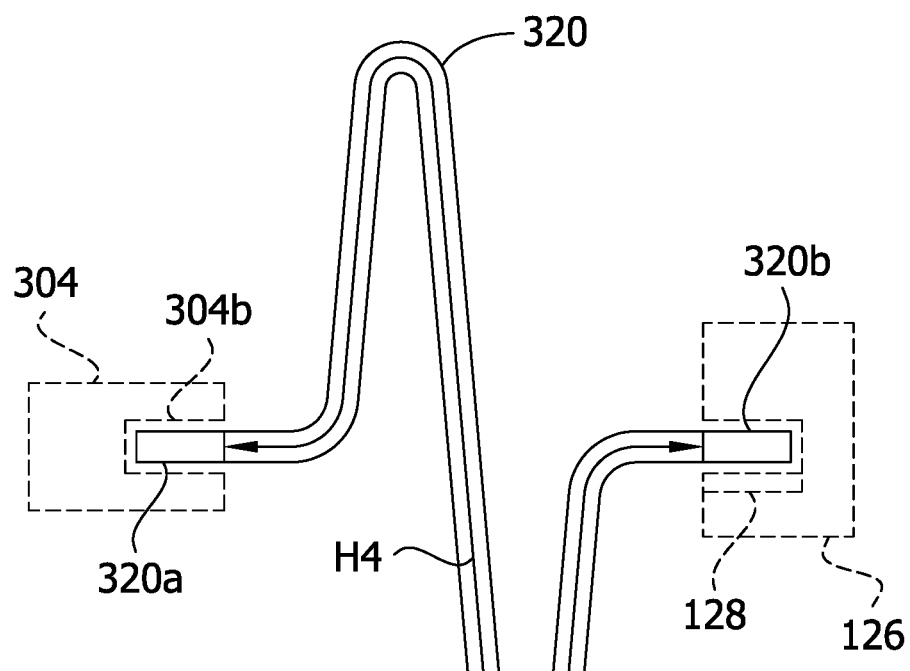
FIG. 10 is cross-sectional view of the fuse holder busbar of FIG. 9.

Referring to FIGS. 9 and 10, yet another example of a fuse holder busbar is indicated at reference numeral 320. In the illustrated example, the fuse holder busbar 320 includes an input terminal 320*a* configured as a single elongate flange extending along the length of the busbar between upper and lower ends thereof and suitable for connection to a plurality of flat busbar fuse holders 304 (FIG. 10), although the input terminal(s) may be of other configurations. An output terminal 320*b*, configured for connection to the contactor 126, is disposed between upper and lower ends of the busbar (e.g., adjacent a mid-length point) on a side of the busbar opposite the input terminal(s) of the busbar the output terminal of the fuse holder busbar.

The illustrated fuse holder busbar 320 defines a heat flow path flowing from the contactor 126 to the fuse holders 304. As shown in FIG. 10, the heat flow path defines a minimum path having a centerline H4 that bisects the heat flow path (e.g., bisects the thickness of the fuse bolder busbar 320 as illustrated) from the input contact 128 of the contacts 126 to the nearest output terminal 304*b* of anyone of the fuse holders 104 along the heat flow path. The illustrated heat flow path, the minimum path, and the corresponding shortest centerline H4 include a plurality of turns (i.e., changes in direction) as the heat flows toward the fuse holder busbar 120. As can be seen from FIG. 10, for example, in the illustrated fuse holder busbar 320, these turns are made out of plane of the busbar 320, and thus, these turns are three-dimensional. Moreover, at least a portion of the heat from the contactor 126 flows upward and against the force of gravity along the length of the busbar 320 and downward against the buoyancy of heat when the box is oriented vertically such as shown in FIG. 1, for example.

The minimum path defined by the fuse holder busbar 320 has an increased length by virtue of the busbar defining the plurality of turns of the heat flow path. As can be understood from FIG. 10, a minimum distance along the minimum path from the input contact 128 to the nearest output terminal 104*b* of anyone of the fuse holders 104 is greater than a minimum distance d3 (i.e., the shortest distance) between the contactor and an output terminal of one of the fuse holders. In one or more examples, the minimum distance along the minimum path may be from about 10% to about 2000% greater than, or from about 25% to about 1500% greater than, or from about 50% to about 1000%, or from about 100% to about 3000% or from about 100% to about 2000% greater than the minimum distance d3 between the input contact 128 of the contactor 126 and the output terminal of the nearest fuse holder 104. In one or more examples, the minimum distance along the minimum path may be from about 25% to about 100%, or from about 33% to about 75%, or from about 50% to about 75% of the length of the vertical row of fuse holders 104.

As can be understood from FIG. 10, the length of the centerline H4 is greater than the minimum distance d3 (i.e., the shortest distance) between the input contact 128 of the contactor 126 and the output terminal 304*b* of the nearest fuse holder 304. In one or more examples, the length of the centerline H1 of the minimum path may be from about 33% to about 2000% greater than, or from about 50% to about 1500% greater than, or from about 100% to about 1000%, or from about 100% to about 3000% or from about 100% to about 2000% greater than the minimum distance d3 between the input contact 128 of the contactor 126 and the output terminal 304*b* of the nearest fuse holder 304.

By having the minimum path greater than the minimum distance d3, the amount of heat (J) from the contactor 126 that reaches the fuse holders 304 through conduction via the fuse holder busbar 320—and thus the average temperature of the fuse holder busbar at the fuse holders (e.g., at the input terminals 320*a* of the fuse holder busbar)—is reduced. Thus, the fuse holder busbar 320 designed according to the teachings set forth herein can reduce the temperatures at the fuse holders 304 to at or below the ratings of the fuse holders and likewise reduce the temperatures at the fuses in the fuse holders to at or below the ratings of the fuses. Moreover, because a portion of the heat flowing through the illustrated fuse holder busbar 320 flows upward and against the force of gravity and downward against the buoyancy of heat when the box is oriented vertically such as shown in FIG. 1, for example, heat conductive heat transfer from the contactor to the fuse holders 104 is further reduced. In addition to reducing the temperatures of the fuse holders 104, a fuse holder busbar 320 designed according to the teachings set forth herein can also reduce the ambient temperature gradient in the enclosure 102 dissipating heat via convection along the increased heat flow of the fuse holder busbar.

The fuse holder busbar may be of other designs to increase the length (or combined length) of the minimum heat flow path(s) in accordance with the teachings set forth herein.

One or more of the illustrated fuse holder busbars 120, 220, 320 may be formed by fabrication of a sheet or other piece of material (e.g., a sheet of copper or other electrically conductive material). In one example, material may be removed (e.g., by stamping) from a piece of material (e.g., a sheet or plate) to form the turns to define the heat flow path(s). In one example, the piece of material may be bent (e.g., using a press brake) to form the turns and define the heat flow path(s). In another example, the busbars 120, 220, 320 may be formed by extrusion. The fuse holder busbars 120, 220, 320 may be formed in other ways.

In one or more embodiments, the busbar assembly 108 may include other electrically operated devices, in addition to or in place of an electrical switch, that produce heat due to being electrically powered and apart from heat produced from power coming from the solar panels.

In one or more embodiments, the teachings set forth above with respect to the fuse holder busbar may also be applied to the main output jumper 122, such as the illustrated embodiment. Referring to FIG. 6, the illustrated main output jumper 122 of the busbar assembly 108 defines a heat flow path flowing from the contactor 126 to the main output terminal 106. As shown in FIG. 6, the heat flow path defines a minimum path having a centerline H5 that bisects the heat flow path from the output contact 130 to the main output terminal 106 along the heat flow path. The illustrated heat flow path, the minimum path, and the corresponding shortest centerline H5 include a plurality of turns (i.e., changes in direction) as the heat flows toward the main output terminal 106. As can be seen from FIG. 2, for example, in the illustrated main output jumper 122, these turns are made both in the plane and out of the plane of the jumper 122, and thus, these turns are three-dimensional. It is understood that the turns may be two-dimensional in other embodiments. Moreover, at least a portion of the heat flow path of the illustrated main output jumper 122 flows upward and against the force of gravity.

The minimum path defined by the main output jumper 122 has an increased length by virtue of the busbar defining the plurality of turns of the heat flow path. As can be understood from FIGS. 6 and 7, a minimum distance along the minimum path from the output contact 130 of the contactor 126 to the main output terminal 106 is greater than a minimum distance d4 (i.e., the shortest distance) between the output contact and the main output terminal. In one or more examples, the minimum distance along the minimum path may be from about 10% to about 2000% greater than, or from about 25% to about 1500% greater than, or from about 50% to about 1000%, or from about 100% to about 3000% or from about 100% to about 2000% greater than the minimum distance d4 between the output contact 130 of the contactor 126 and the main output terminal 106.

Figure 7:
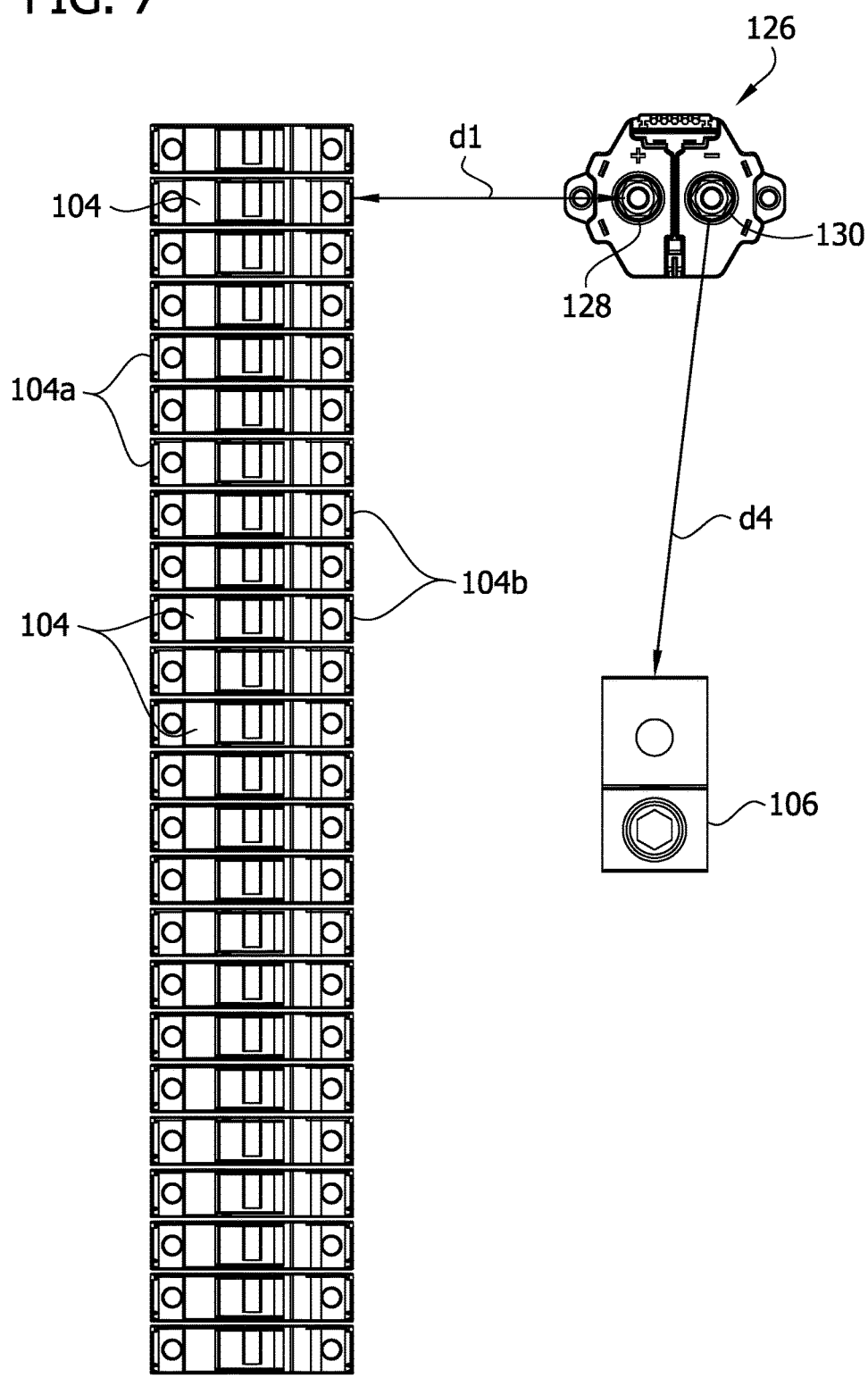
FIG. 7 is similar to FIG. 6, with the busbar assembly removed.

As can be understood from FIGS. 6 and 7, the length of the centerline H5 is greater than the minimum distance d4 (i.e., the shortest distance) between the output contact 130 of the contactor 126 and the main output terminal 106. In one or more examples, the length of the centerline H5 of the minimum path may be from about 33% to about 2000% greater than, or from about 50% to about 1500% greater than, or from about 100% to about 1000%, or from about 100% to about 3000% or from about 100% to about 2000% greater than the minimum distance d4 between the output contact 130 of the contactor 126 and the main output terminal 106.

By having the minimum path greater than the minimum distance d4, the amount of heat (J) from the contactor 126 that reaches the main output terminal 106 through conduction via the main output jumper 122—and thus the average temperature of the main output jumper at the main output terminal—is reduced. Thus, the main output jumper 122 designed according to the teachings set forth herein can reduce the temperatures at the main outlet terminal 106 to at or below the ratings of the main outlet terminal and likewise reduce the temperatures at the main outlet feed connected to the main outlet terminal to at or below the ratings of the main outlet feed. Moreover, because a portion of the minimum path of the heat flow path of the illustrated main output jumper 122 flows upward and against the force of gravity and downward against the buoyancy of heat when the box is oriented vertically such as shown in FIG. 1, for example, heat conductive heat transfer from the contactor to the main outlet terminal 106 is further reduced. In addition to reducing the temperatures of the main outlet terminal 106, the main output jumper 122 designed according to the teachings set forth herein can also reduce the ambient temperature gradient in the enclosure 102 by dissipating heat via convection along the increased heat flow path of the main output jumper.

Figure 11:
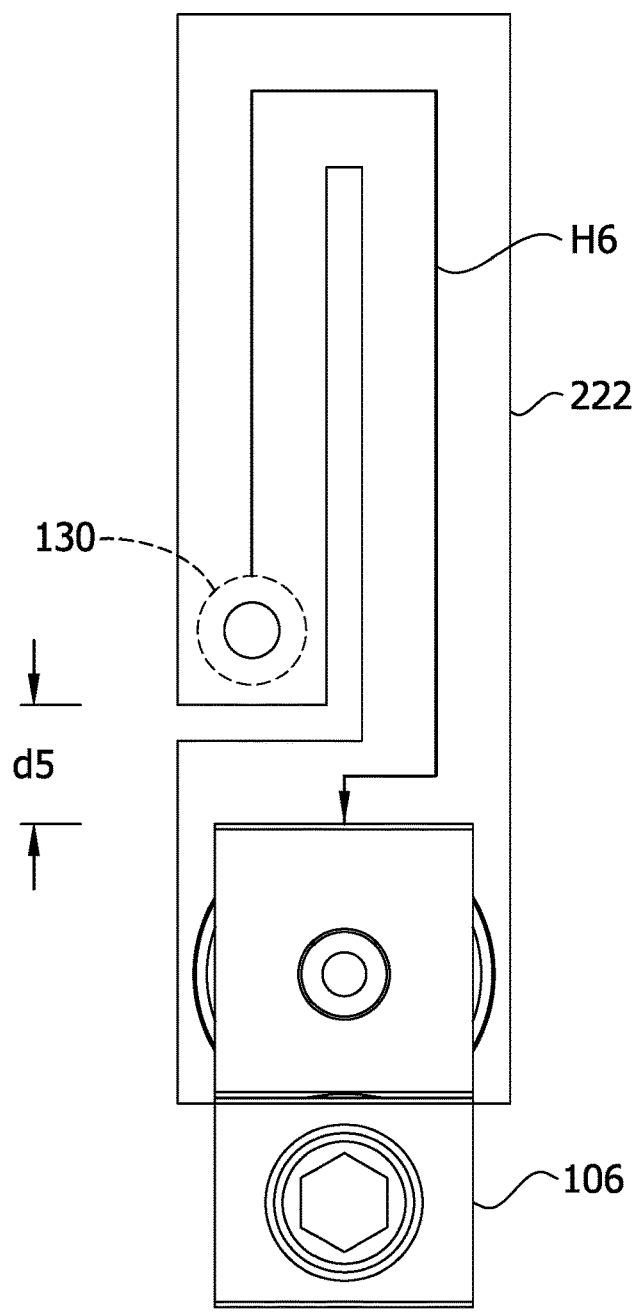
FIG. 11 is plan view of a second embodiment of a main outlet busbar for a busbar assembly.

Referring to FIG. 11, another embodiment of a main output jumper is generally indicated at reference numeral 222. The jumper 222 defines a heat flow path flowing from the contactor 126 to the main output terminal 106. As shown in FIG. 11, the heat flow path defines a minimum path having a centerline H6 that bisects the heat flow path from the output contact 130 to the main output terminal 106 along the heat flow path. The illustrated heat flow path, the minimum path, and the corresponding shortest centerline H6 include a plurality of turns (i.e., changes in direction) as the heat flows toward the main output terminal 106. These turns are made in the plane of the jumper 222, and thus, these turns are two-dimensional. Moreover, at least a portion of the heat flow path of the illustrated main output jumper 222 flows upward and against the force of gravity and downward against the buoyancy of heat when the box is oriented vertically such as shown in FIG. 1, for example.

The minimum path defined by the main output jumper 222 has an increased length by virtue of the busbar defining the plurality of turns of the heat flow path. As can be understood from FIG. 11, a minimum distance along the minimum path from the output contact 130 of the contactor 126 to the main output terminal 106 is greater than a minimum distance d5 (i.e., the shortest distance) between the output contact and the main output terminal. In one or more examples, the minimum distance along the minimum path may be from about 10% to about 2000% greater than, or from about 25% to about 1500% greater than, or from about 50% to about 1000%, or from about 100% to about 3000% or from about 100% to about 2000% greater than the minimum distance d5 between the output contact 130 of the contactor 126 and the main output terminal 106.

As can be understood from FIG. 11, the length of the centerline H6 is greater than the minimum distance d5 (i.e., the shortest distance) between the output contact 130 of the contactor 126 and the main output terminal 106. In one or more examples, the length of the centerline H6 of the minimum path may be from about 33% to about 2000% greater than, or from about 50% to about 1500% greater than, or from about 100% to about 1000%, or from about 100% to about 3000% or from about 100% to about 2000% greater than the minimum distance d5 between the output contact 130 of the contactor 126 and the main output terminal 106.

By having minimum path greater than the minimum distance d5, the amount of heat (J) from the contactor 126 that reaches the main output terminal 106 through conduction via the main output jumper 222—and thus the average temperature of the main output jumper at the main output terminal—is reduced. Thus, the main output jumper 222 designed according to the teachings set forth herein can reduce the temperatures at the main outlet terminal 106 to at or below the ratings of the main outlet terminal and likewise reduce the temperatures at the main outlet feed connected to the main outlet terminal to at or below the ratings of the main outlet feed. Moreover, because a portion of the minimum path of the heat flow path of the illustrated main output jumper 222 flows upward and against the force of gravity and downward against the buoyancy of heat when the box is oriented vertically such as shown in FIG. 1, for example, heat conductive heat transfer from the contactor to the main outlet terminal 106 is further reduced. In addition to reducing the temperatures of the main outlet terminal 106, the main output jumper 222 designed according to the teachings set forth herein can also reduce the ambient temperature gradient in the enclosure 102 by dissipating heat via convection along the increased heat flow path of the main output jumper.

Figure 12:
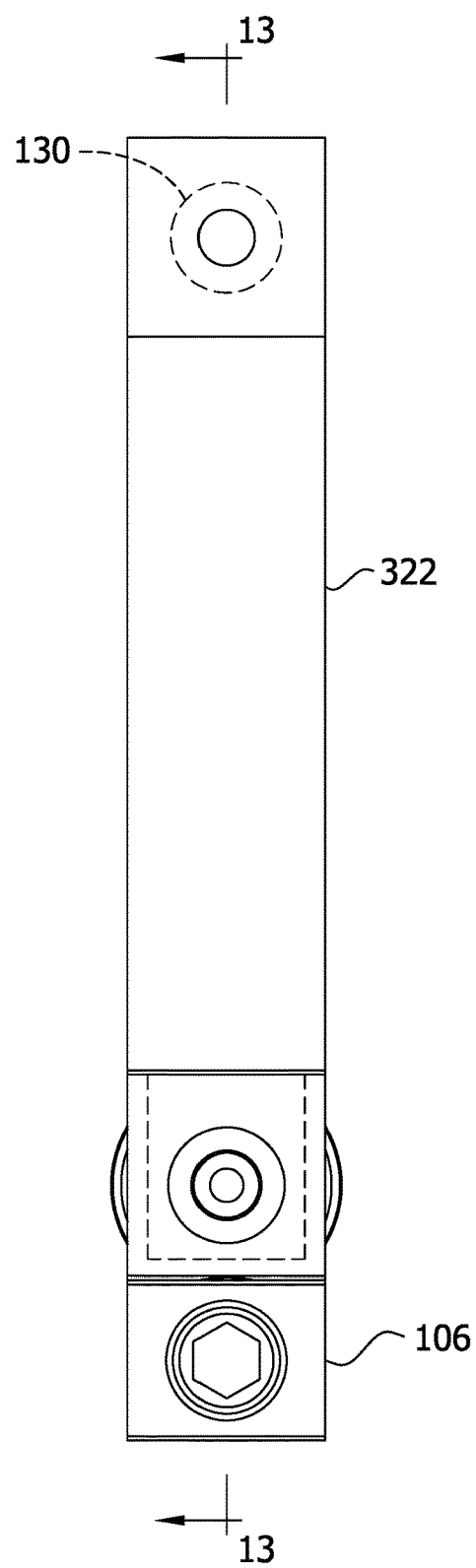
FIG. 12 is a plan view of a third embodiment of a main outlet busbar for a busbar assembly.
Figure 13:
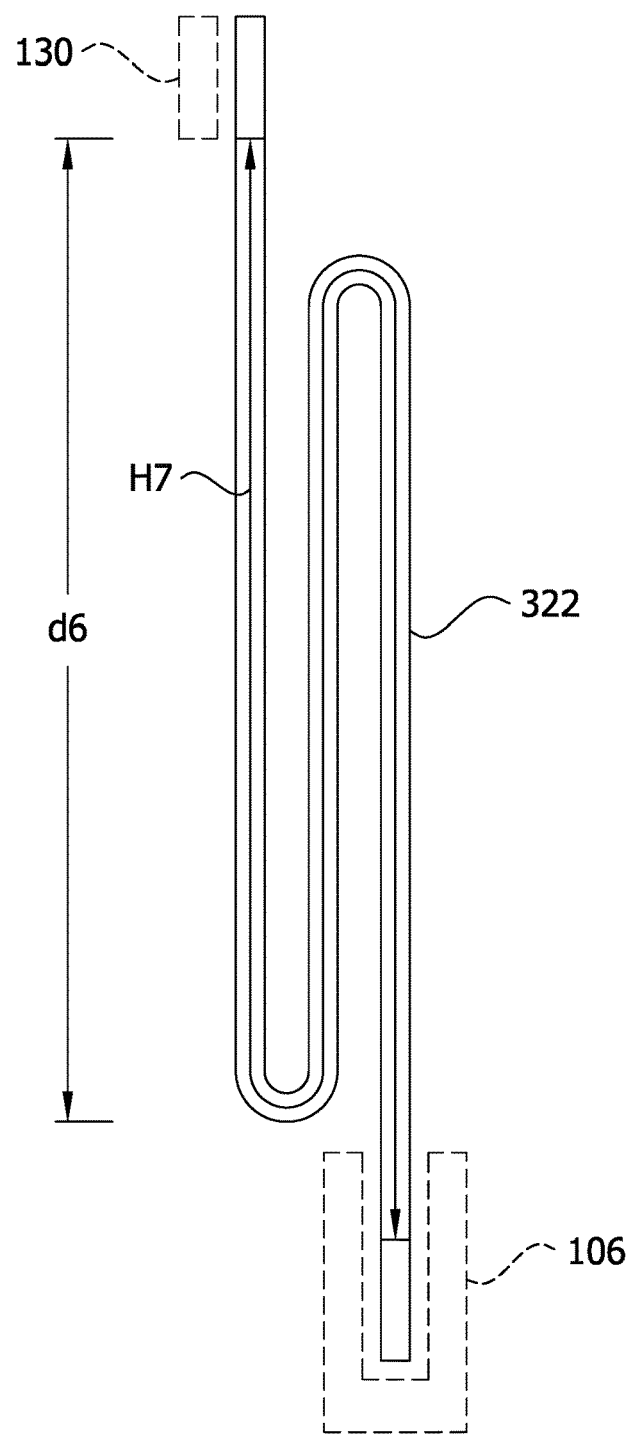
FIG. 13 is a cross-sectional view taken through the plane defined by the line 13-13 in FIG. 12.

Referring to FIGS. 12 and 13, another embodiment of a main output jumper is generally indicated at reference numeral 322. The jumper 322 defines a heat flow path flowing from the contactor 126 to the main output terminal 106. As shown in FIG. 13, the heat flow path defines a minimum path having a centerline H7 that bisects the heat flow path from the output contact 130 to the main output terminal 106 along the heat flow path. The illustrated heat flow path, the minimum path, and the corresponding shortest centerline H7 include a plurality of turns (i.e., changes in direction) as the heat flows toward the main output terminal 106. These turns are made out of the plane of the jumper 322, and thus, these turns are three-dimensional. The main output jumper 322 is folded over itself to form layers. Moreover, at least a portion of the heat flow path of the illustrated main output jumper 322 flows upward and against the force of gravity and downward against the buoyancy of heat when the box is oriented vertically such as shown in FIG. 1, for example.

The minimum path defined by the main output jumper 322 has an increased length by virtue of the busbar defining the plurality of turns of the heat flow path. As can be understood from FIG. 13, a minimum distance along the minimum path from the output contact 130 of the contactor 126 to the main output terminal 106 is greater than a minimum distance d6 (i.e., the shortest distance) between the output contact and the main output terminal. In one or more examples, the minimum distance along the minimum path may be from about 10% to about 2000% greater than, or from about 25% to about 1500% greater than, or from about 50% to about 1000%, or from about 100% to about 3000% or from about 100% to about 2000% greater than the minimum distance d6 between the output contact 130 of the contactor 126 and the main output terminal 106.

As can be understood from FIG. 13, the length of the centerline H7 is greater than the minimum distance d6 (i.e., the shortest distance) between the output contact 130 of the contactor 126 and the main output terminal 106. In one or more examples, the length of the centerline H7 of the minimum path may be from about 33% to about 2000% greater than, or from about 50% to about 1500% greater than, or from about 100% to about 1000%, or from about 100% to about 3000% or from about 100% to about 2000% greater than the minimum distance d6 between the output contact 130 of the contactor 126 and the main output terminal 106.

By having the minimum path greater than the minimum distance d6, the amount of heat (J) from the contactor 126 that reaches the main output terminal 106 through conduction via the main output jumper 322—and thus the average temperature of the main output jumper at the main output terminal—is reduced. Thus, the main output jumper 322 designed according to the teachings set forth herein can reduce the temperatures at the main outlet terminal 106 to at or below the ratings of the main outlet terminal and likewise reduce the temperatures at the main outlet feed connected to the main outlet terminal to at or below the ratings of the main outlet feed. Moreover, because a portion of the minimum path of the heat flow path of the illustrated main output jumper 322 flows upward and against the force of gravity and downward against the buoyancy of heat when the box is oriented vertically such as shown in FIG. 1, for example, heat conductive heat transfer from the contactor to the main outlet terminal 106 is further reduced. In addition to reducing the temperatures of the main outlet terminal 106, the main output jumper 322 designed according to the teachings set forth herein can also reduce the ambient temperature gradient in the enclosure 102 to meet code by dissipating heat via convection along the increased heat flow path of the main output jumper.

In one or more embodiments, the combiner box 100 may include the fuse holder busbar (e.g., busbar 120, 220, and/or 320) constructed according to the teachings set forth herein, and the main output jumper may include a conventional construction. In one or more embodiments, the combiner box 100 may include the main output jumper (e.g., jumper 122, 222, and/or 322) constructed according to the teachings set forth herein, and the fuse holder busbar may include a conventional construction.

Figure 14:
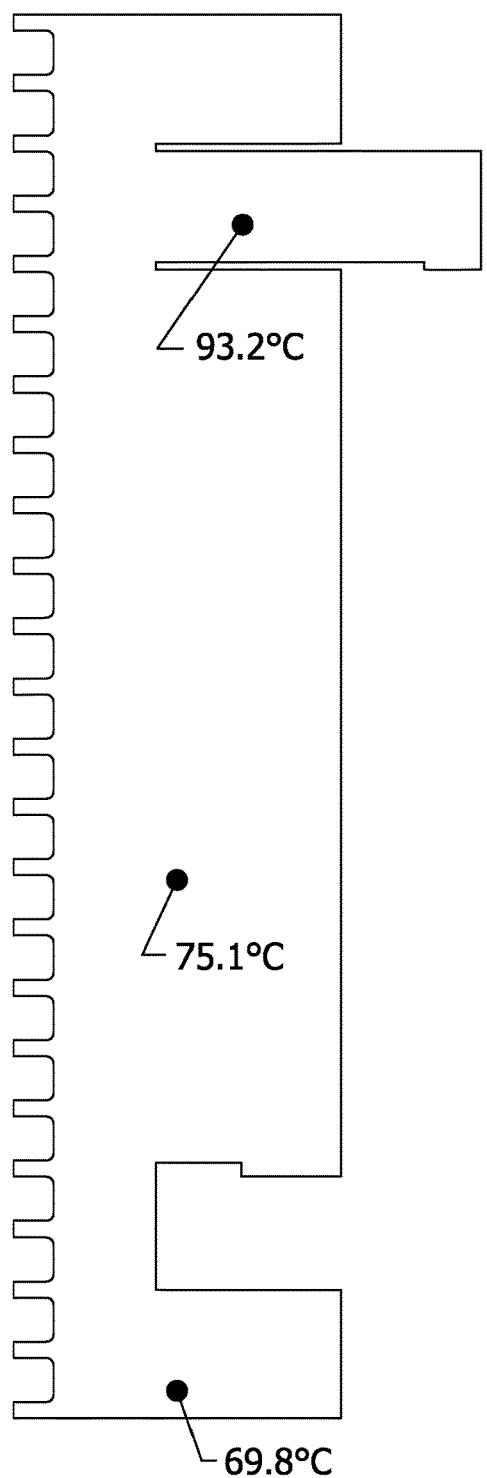
FIG. 14 is a thermal simulation image of a conventional fuse holder busbar with actual lab test temperatures overlaid.
Figure 15:
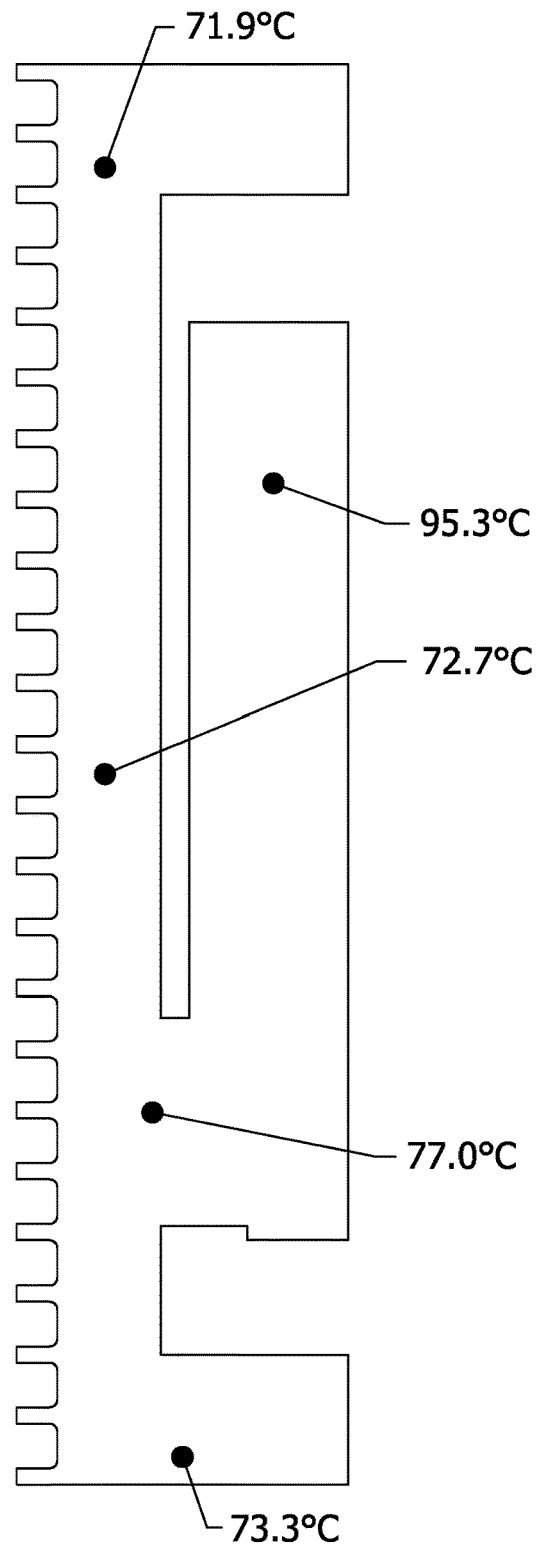
FIG. 15 is a thermal simulation image of a fuse holder busbar constructed according to the teachings of the present disclosure with actual lab test temperatures overlaid.

Referring to FIGS. 14 and 15, a comparison of heat transfer of a conventional fuse holder busbar (FIG. 14) and a fuse holder busbar constructed according to the teachings of the present disclosure (FIG. 15) is shown. Each figure includes a thermal simulation image and overlaid actual lab test temperatures.

Modifications and variations of the disclosed embodiments are possible without departing from the scope of the invention defined in the appended claims.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A solar combiner box comprising:
an enclosure defining an interior;
a plurality of fuse holders in the interior of the enclosure, each plurality of fuse holders including an output terminal;
a main output terminal in the interior of the enclosure; and
a busbar assembly connecting the plurality of fuse holders to the main output terminal, wherein the busbar assembly includes
a fuse holder busbar connected to the output terminals of the plurality of fuse holders,
a main output jumper connected to the main output terminal, and
a switch selectively connecting the fuse holder busbar and the main output jumper,
wherein the fuse holder busbar is an integrally formed one-piece component and defines a heat flow path from the switch to the plurality of fuse holders, the heat flow path defining a minimum path from the switch to a nearest output terminal of anyone of the fuse holders along the heat flow path,
wherein a minimum distance along the minimum path from the switch to the nearest output terminal of the corresponding fuse holder is greater than a minimum distance between the switch and an output terminal of one of the fuse holders.

2. The solar combiner box set forth in claim 1, wherein the plurality of fuse holders are arranged in a fuse holder row having opposite first and second ends, wherein the switch is adjacent the first end of the fuse holder row, wherein the second end of the row is upstream of the first end of the fuse holder row along the heat flow path.

3. The solar combiner box set forth in claim 2, wherein the heat flow path extends from the switch adjacent the first end of the fuse holder row toward the second end of the fuse holder row, and from adjacent the second end of the fuse holder row toward the first end of the fuse holder row.

4. The solar combiner box set forth in claim 1, wherein the fuse holder busbar includes a plurality of turns.

5. The solar combiner box set forth in claim 4, wherein the turns are in-plane of the fuse holder busbar.

6. The solar combiner box set forth in claim 4, wherein the turns are out-of-plane of the fuse holder busbar.

7. The solar combiner box set forth in claim 4, wherein at least one of the turns is in-plane of the fuse holder busbar, and wherein at least one of the turns is out-of-plane of the fuse holder busbar.

8. The solar combiner box set forth in claim 1, wherein the heat flow path comprises a first heat flow path flowing in a first direction, and a second heat flow path flowing in a second direction that is opposite the first direction.

9. The solar combiner box set forth in claim 8, wherein the plurality of fuse holders are arranged in a fuse holder row having opposite first and second ends, wherein the first heat flow path flows toward the first end of the fuse holder row, and wherein the second heat flow path flows toward the second end of the fuse holder row.

10. The solar combiner box set forth in claim 8, wherein the plurality of fuse holders are arranged in a fuse holder row having opposite first and second ends, wherein the switch is generally adjacent a mid-length of the fuse holder row.

11. The solar combiner box set forth in claim 1, wherein the switch comprises an electrically controlled switch.

12. The solar combiner box set forth in claim 11, wherein the electrically controlled switch comprises a contactor.

13. The solar combiner box set forth in claim 1, wherein the main output jumper defines an output-jumper heat flow path from the switch to the main output terminal, the output-jumper heat flow path defining a minimum output-jumper path from the switch to the main output terminal along the output-jumper heat flow path,
wherein a minimum distance along the minimum output-jumper path from the switch to the main output terminal is greater than a minimum distance between the switch and the main output terminal.

14. The solar combiner box set forth in claim 13, wherein the main output jumper includes a plurality of turns.

15. A solar combiner box comprising:
an enclosure defining an interior;
a plurality of fuse holders in the interior of the enclosure, each plurality of fuse holders including an output terminal;
a main output terminal in the interior of the enclosure; and
a busbar assembly connecting the plurality of fuse holders to the main output terminal, wherein the busbar assembly includes
a fuse holder busbar connected to the output terminals of the plurality of fuse holders,
a main output jumper connected to the main output terminal, and
an electrically controlled switch selectively connecting the fuse holder busbar and the main output jumper,
wherein the main output jumper defines a heat flow path from the electrically controlled switch to the main output terminal, the heat flow path defining a minimum path from the electrically controlled switch to the main output terminal along the heat flow path,
wherein a minimum distance along the minimum path from the electrically controlled switch to the main output terminal is greater than a minimum distance between the electrically controlled switch and the main output terminal.

16. The solar combiner box set forth in claim 15, wherein the main output jumper includes a plurality of turns.

17. An electrical box comprising:
an enclosure defining an interior;
a first electrical component including an output terminal in the interior of the enclosure;
a second electrical component including an input terminal in the interior of the enclosure; and
a jumper connected to the output terminal of the first electrical component and the input terminal of the second electrical component,
wherein the jumper is an integrally formed one-piece component and defines a heat flow path between the first and second electrical components, the heat flow path defining a minimum path between the first and second electrical components along the heat flow path,
wherein a minimum distance along the minimum heat path between the first and second electrical components is greater than a minimum distance between first and second electrical components,
wherein the jumper includes a plurality of turns,
wherein the jumper comprises a busbar.

18. A solar combiner box comprising:
an enclosure defining an interior;
a plurality of fuse holders in the interior of the enclosure, each plurality of fuse holders including an output terminal;
a main output terminal in the interior of the enclosure; and
a busbar assembly connecting the plurality of fuse holders to the main output terminal, wherein the busbar assembly includes
a fuse holder busbar connected to the output terminals of the plurality of fuse holders,
a main output jumper connected to the main output terminal, and
a switch selectively connecting the fuse holder busbar and the main output jumper,
wherein the fuse holder busbar defines a heat flow path from the switch to the plurality of fuse holders, the heat flow path defining a minimum path from the switch to a nearest output terminal of anyone of the fuse holders along the heat flow path,
wherein a minimum distance along the minimum path from the switch to the nearest output terminal of the corresponding fuse holder is greater than a minimum distance between the switch and an output terminal of one of the fuse holders,
wherein the plurality of fuse holders are arranged in a fuse holder row having opposite first and second ends, wherein the switch is adjacent the first end of the fuse holder row, wherein the second end of the row is upstream of the first end of the fuse holder row along the heat flow path,
wherein the heat flow path extends from the switch adjacent the first end of the fuse holder row toward the second end of the fuse holder row, and from adjacent the second end of the fuse holder row toward the first end of the fuse holder row.

* * * * *